United States Patent
Al-Gharaibeh et al.

(10) Patent No.: US 11,675,889 B1
(45) Date of Patent: Jun. 13, 2023

(54) SYSTEMS AND METHODS FOR DATA INTEGRITY AND CONFIDENTIALITY WITHIN A COMPUTING SYSTEM

(71) Applicant: ARCHITECTURE TECHNOLOGY CORPORATION, Eden Prairie, MN (US)

(72) Inventors: Jafar Al-Gharaibeh, Eden Prairie, MN (US); Timothy Hartley, Eden Prairie, MN (US); Ranga S. Ramanujan, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 276 days.

(21) Appl. No.: 17/093,206

(22) Filed: Nov. 9, 2020

Related U.S. Application Data (63) Continuation of application No. 15/912,411, filed on Mar. 5, 2018, now Pat. No. 10,831,877.

(51) Int. Cl.
*G06F 21/40* (2013.01)
*G06F 21/60* (2013.01)
*G06F 21/31* (2013.01)
*H04L 9/40* (2022.01)

(52) U.S. Cl.
CPC ............ *G06F 21/40* (2013.01); *G06F 21/316* (2013.01); *G06F 21/602* (2013.01); *H04L 63/102* (2013.01); *H04L 63/0815* (2013.01)

(58) Field of Classification Search
CPC .... G06F 21/53; G06F 21/575; G06F 21/6218; H04W 12/08; H04W 12/0806; H04W 4/50; H04W 88/06
See application file for complete search history.

(56) References Cited

U.S. PATENT DOCUMENTS

| 6,122,514 A | 9/2000 | Spaur et al. |
| 9,769,131 B1 | 9/2017 | Hartley et al. |
| 2012/0179915 A1* | 7/2012 | Horn .................... G06F 21/80 726/19 |
| 2015/0072726 A1 | 3/2015 | Stern |

(Continued)

OTHER PUBLICATIONS

Architecture Technology Corporation, "Identification and Significance of the Problem or Opportunity," Proposal No. N172-105-0398, Topic No. N172-105, 10 pages.

*Primary Examiner* — Olugbenga O Idowu
(74) *Attorney, Agent, or Firm* — Foley & Lardner LLP (57) ABSTRACT

Disclosed herein are embodiments of systems, methods, and products comprise a computing device, which allows a device to be used in different classification levels by powering the device down and booting to a different classified level without the need to switch hard drives. The disclosed software shield and persona switcher (Shielder) module provides independent application environments (personas) for separate security domains while allowing fast transition between personas. Shielder module supports multiple security classification via a minimal system storage partitioning. Shielder module allows efficient collection and reallocation of memory and persistent storage according to need and priority. Shielder module provides secure management of communication media by directing the system communication according to the security profile of the active persona.

18 Claims, 4 Drawing Sheets

(56) References Cited

U.S. PATENT DOCUMENTS

2015/0074764 A1    3/2015  Stern
2015/0286839 A1  10/2015  Ben-Shalom et al.
2017/0300671 A1* 10/2017  Iyengar ............... G06F 21/6218
2018/0337936 A1  11/2018  Mehrotra et al.

* cited by examiner

SYSTEMS AND METHODS FOR DATA INTEGRITY AND CONFIDENTIALITY WITHIN A COMPUTING SYSTEM

CROSS-REFERENCE TO RELATED APPLICATION

This application is a continuation application of U.S. application Ser. No. 15/912,411, entitled "Systems and Methods for Implementing Multiple Personas in a Computing System," filed Mar. 5, 2018, which is incorporated by reference in its entirety.

TECHNICAL FIELD

This application relates generally to methods and systems for data integrity and confidentiality within a computing system.

BACKGROUND

In a tactical environment, a device may require multiple operating systems with multiple security domains and classification levels. The device may include end user devices (EUDs), portable computers, servers, and the like. For example, the device user may be a military officer. The user may need to use one unsecure operating system for personal things, and use another secure operating system for mission plan in the same device. The user may require the ability to easily switching from one operating system to another on the same device without the need to switch hard drives. Robust protection may be required to operate the same device in a multi-level security system, which is especially important for end user devices and portable computers.

The device may be targets of attacks to comprise or corrupt the device data. Attacks may be typically unpredictable in frequency and occurrence. Some of the software attacks may exploit vulnerabilities on the target system and the most challenging attacks may be zero-day vulnerabilities because it may take days or even weeks to patch an exploit. The zero-day vulnerabilities may leave the system during that period exposed to attacks that may put the system out of service, data corruption, or even data breach. With the increased complexity of software and operating systems, the zero-day vulnerabilities may become more common in addition to other types of threats. High availability of the devices may be very critical to operational missions, thus there must be a protection mechanism to protect the devices against any attack including zero-day vulnerability by preventing any down time or keep the down time minimum.

Detecting unknown threats may be challenging and resource intensive in an already constrained environment. Conventional solutions require too much processing or overhead and may not provide any protection or mitigation against zero-day vulnerabilities. In addition, conventional systems do not provide the ability to allow the same device operate in different classification levels and switch the device easily from one classification level to another without switching the device's hard disk.

SUMMARY

What is therefore desired is a solution that protects the device from software security threats, and allows the device switch to different classification levels by reconfiguring hardware and software resources to a different classified level without the need to switch hard drives. What is further desired is a solution that provides protection against any attack including zero-day vulnerability.

Embodiments disclosed herein solve the aforementioned problems and other problems by supporting multiple security classifications via a minimal system storage partitioning. Discussed herein is a software shield and persona switcher (Shielder) system that may maintain security and integrity of the system by detecting suspicious or unauthorized access to the system. A persona may be an independent application and/or operating system. Shielder may provide independent personas for separate security domains while allowing fast transition between personas. Shielder module may instantly respond to the threat and roll back the system state to a known good state if necessary.

In one embodiment, a computer implemented method comprises in response to a computer receiving a boot command, retrieving, by the computer, one or more files associated with a plurality of personas from a non-transitory storage medium; displaying, by the computer, a first graphical user interface including a plurality of interactive components corresponding to the plurality of personas to allow a user to select a persona; in response to receiving by the computer a selection of an interactive component corresponding to a first persona from the plurality of personas: displaying, by the computer, a second graphical user interface configured to prompt an entry of user credentials associated with the first persona; in response to receiving a first set of user credentials, authenticating, by the computer, the first set of user credentials when a comparison of the first set of user credentials with corresponding set of stored user credentials returns a match; retrieving, by the computer, a first set of encrypted software modules and data files associated with the first persona; decrypting, by the computer, the first set of encrypted software modules and data files using a first set of cryptographic keys associated with the first persona to generate a first set of software modules and data files; allocating, by the computer, a first set of hardware resources to the first set of software modules and data files; in response to receiving a request to switch to a second persona: encrypting and storing, by the computer, a system image of the first set of software modules and data files using the first set of cryptographic keys; in response to receiving a second set of user credentials associated with the second persona, authenticating, by the computer, the second set of user credentials associated with the second persona when a comparison of the second set of user credentials with corresponding set of stored user credentials returns a match; retrieving, by the computer, a second set of encrypted software modules and data files associated with the second persona, wherein the second set of encrypted software modules and data files is different from the first set of encrypted software modules and data files; decrypting, by the computer, the second set of encrypted software modules and data files using a second set of cryptographic keys associated with the second persona to generate a second set of software modules and data files, whereby the first and second set of cryptographic keys cryptographically partition the first and second set of software modules and data files; and allocating, by the computer, a second set of hardware resources to the second set of software modules and data files.

In another embodiment, a computer based system comprises a non-transitory storage medium storing one or more files associated with a plurality of personas, a plurality of sets of software modules and data files associated with the corresponding personas, wherein each set of software modules and data files is encrypted with a respective set of cryptographic keys to cryptographically partition the plurality of sets of software modules and data files; a processor configured to: in response to the processor receiving a boot command, retrieve the one or more files associated with the plurality of personas from non-transitory storage medium; display a first graphical user interface including a plurality of interactive components corresponding to the plurality of personas to allow a user to select a persona; in response to receiving by the processor a selection of an interactive component corresponding to a first persona from the plurality of personas: display a second graphical user interface configured to prompt an entry of user credentials associated with the first persona; in response to receiving a first set of user credentials, authenticate the first set of user credentials when a comparison of the first set of user credentials with corresponding set of stored user credentials returns a match; retrieve a first set of encrypted software modules and data files associated with the first persona; decrypt the first set of encrypted software modules and data files using a first set of cryptographic keys associated with the first persona to generate a first set of software modules and data files; allocate a first set of hardware resources to the first set of software modules and data files; in response to the processor receiving a request to switch to a second persona: encrypt and store a system image of the first set of software modules and data files using the first set of cryptographic keys; in response to receiving a second set of user credentials associated with the second persona, authenticate the second set of user credentials when a comparison of the second set of user credentials with corresponding set of stored user credentials returns a match; retrieve a second set of encrypted software modules and data files associated with the second persona; decrypt the second set of encrypted software modules and data files using a second set of cryptographic keys associated with the second persona to generate a second set of software modules and data files; and allocate a second set of hardware resources to the second set of software modules and data files.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Figure 1:
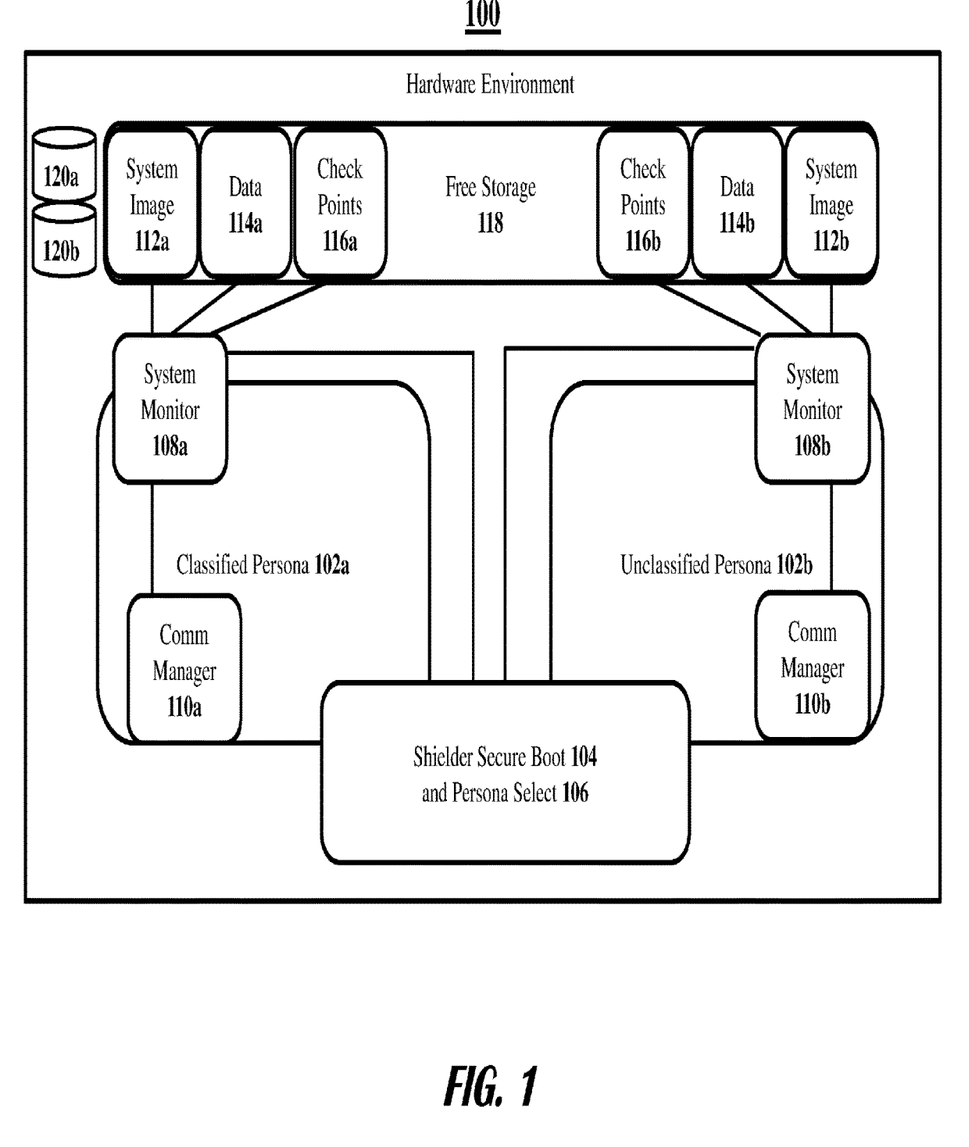
FIG. 1 illustrates a computer system for protecting data integrity and confidentiality, according to an exemplary embodiment.

FIG. 1 illustrates components of an exemplary system 100 for protecting data integrity and confidentiality. The exemplary system 100 may include the major components of the Shielder software solution within the context of a hardware computing environment. The example of the hardware computing environment may be any computing device including, but not limited to, a desktop computer, a laptop, a personal digital assistant (PDA), a smartphone, a tablet computer, and the like. The computing device may contain exemplary hardware resources such as memory, storage, processors, and input/output devices. The exemplary embodiment of a Shielder module within the computing device may include several components to accomplish various tasks, such as a classified persona 102a and an unclassified persona 102b, a Shielder Secure Boot 104 and a Shielder Persona Select 106, a Shielder System Monitor 108a, 108b, and a Shielder Communication Manager 110a, 110b. By employing these several components, the Shield may ensure the system image is in a trusted state continuously.

Shielder module may support different security domains in the same device by providing more than one isolated personas in the same device while allowing fast transition between personas. Each persona may be an independent application environment or operating system. For example, each persona may comprise its corresponding software and hardware components such as software modules, data files, applications, programs, services, memory resources, processing resources, application storage, security restrictions and any other type of hardware/software resources or data. The general framework for protection and separation of different personas may take three directions. The first direction may be dual boot setup with tools mainly installed directly inside the operating system of the computing device. The second direction may be virtualized environment where each virtual machine (VM) runs its own security level. The virtual environment with multiple VMs may allow many components of Shielder module to be independent of the operating system. The third direction may be dual boot virtualized environment with each virtualized environment running only one VM. For example, two installed hypervisors may be in a dual boot configuration. Each hypervisor may host one VM. The hypervisor and the VM combined may be within the same security domain, which may enable Shielder components to be largely independent of the target operating system.

In some embodiments, Shielder module may provide the basis for supporting and isolating two distinct personas 102a, 102b, one persona 102a processing classified data and applications and capable of communicating directly with classified networks, and one persona 102b processing unclassified data and applications and capable of communicating directly with unclassified networks. There may be more than two personas in the same hardware, and each persona may be isolated from another. In other words, when the user selects one persona to run by secure booting the system, the user may only have access to the selected one persona, but not be able to access any other personas. To access another persona, the user may need to reboot the system and select the interested persona.

Multiple personas may be stored in one storage device. For example, classified persona may have its corresponding system image 112a, data 114a, and checkpoints 116a stored in a storage device 118 (e.g., hard disk). The unclassified persona 102b may have its corresponding system image 112b, data 114b, and checkpoints 116b stored in the same storage device 118. However, Shielder module may logically separate the hard disk to ensure every persona and its corresponding memory, cache resources are encrypted by a different set of keys. To access one persona, the user may need to provide user credentials for Shielder module to authenticate the user. Only authenticated users may be able to access the personas.

The storage device 180 may comprise a security database 120a and a user database 120b. The data in the databases may be protected and encrypted using user passwords or off-device cryptographic keys, especially the security database that contains the keys to unlock other components in the system. The security database 120a may be any-transitory machine-readable media configured to store data. The security database 120a may include information on each of the multiple personas. Shielder module may leverage the security database 120a to validate the software and hardware components of each persona to ensure that the persona is secure. Specifically, for each persona, the security database 120a may include fields of persona identifier, the system image, data associated with the specific persona that may include software and hardware components of the persona, the checkpoints as shown in FIG. 1. In addition, the security database may include other security information for each persona, such as cryptographic keys used to encrypt and decrypt the components of the persona; signatures of each component of the persona; security profile that may define the restrictions on communications and data access rules of the persona; and limits of a predefined trusted operation status that may define a list of trusted system status when the persona is performing various operations. The cryptographic keys may cryptographically partition software components of different personas. Different personas may have different software components and there may be no cross-talk between the software components because of the cryptographic partition.

The user database 120b may be any-transitory machine-readable media configured to store data. The user database 120b may include user profile information and user credentials for each persona. As discussed above, only authenticated users may be able to access a persona. Shielder module may require a user to register for one or more personas. Shielder module may store the user registration information including the user credentials into the user database 120b. A user may need to register for each of the one or more personas separately. The user database 120b may comprise user identifier, persona identifier and the user credentials.

Shielder Secure Boot 104 may need to access the security database 120a when performing the various tasks to ensure the system security. Shielder Secure Boot 104 may validate the device system that includes software and hardware components of each persona. Specifically, Shielder Secure Boot 104 may calculate secure hashes of Shielder software components and the different personas 102a, 102b installed on the system, and securely verify signatures before loading components or starting Shielder Persona Select 106. For example, Shielder Secure Boot 104 may query the respective cryptographic key from the security database 120a for the software and hardware components of different personas, apply the respective key on the calculated secure hashes to derive the signatures of different personas, and compare the derived signatures with the signatures stored in the security database 120a. If the comparison returns a match, Shielder Secure Boot 104 may verify that the device system is secure. Shielder Secure Boot 104 may also verify the physical hardware environment, including hardware drives and hardware itself, and to ensure USB-connected hardware has an approved identifier. In some embodiments, hardware components (also referred to as hardware resources) may be shared across different personas. For example, a first persona may utilize a portion of a memory and a second persona may utilize the same person of the memory when the first persona is closed and the second persona is opened. In other words, hardware resources for the second persona can be the same as the hardware resources for the first persona.

In some embodiments, Shielder module may secure boot the computing device system before loading components or starting Shielder Persona Select 106. Shielder Secure Boot 104 is the key to provide secure, tamper-proof Shielder software. When a user boots a device, Shielder Secure Boot 104 may validate itself, other Shielder software components and related hardware (like hardware drives), and the multiple persona disk images. Shielder module may not start a persona until a through validation of Shielder module environment is completed. A trusted platform module (TPM) or other system-embedded secure boot feature might be necessary to ensure the validation. In the absence of a TPM feature, Shielder module may use network communication with a remote server to validate signatures generated for Shielder module components.

Shielder Secure Boot 104 may also validate the integrity of the hardware environment, even if an earlier stage in booting has performed validation. Shielder Secure Boot 104 may ensure the hardware integrity in a changing communication environment, in which permanent interfaces like Wi-Fi and cell interfaces may connect to different endpoints over time and other USB-connected interfaces may add or remove, which may affect the system state.

Shielder Secure Boot 104 may also validate the read-only portions of the persistent storage of personas. Monitoring storage access patterns may enable smart algorithms to identify read-only systems and application storage. Shielder Secure Boot 104 may fingerprint the read-only areas using a secure hash or multiple secure hashes on multiple blocks to detect modification.

Shielder Persona Select 106 may allow the user to select a persona at boot time. Shielder Persona Select 106 may provide the first level security protection by authenticating a user to boot to a specific persona. When the user selects a persona and requests to run the persona, Shielder Persona Select 106 may require the user to input the user credentials corresponding to the persona. In some embodiments, the user credentials may be username and password entered at a graphical user interface (GUI). Other exemplary user credentials may include biometric information such as fingerprint and retina scan, a personal identification number (PIN), and/or any other type of credentials. Shielder Persona Select 106 may retrieve the user credentials by querying the user database 120b, and check if the inputted credentials match the credentials stored in the user database 120b. If the inputted credentials match the stored credentials, Shielder Persona Select 106 may authenticate and authorize the user and run the persona; otherwise, Shielder Persona Select 106 may deny the user.

Shielder Persona Select 106 may reallocate storage resources when necessary, and sanitize reclaimed resources before reallocation. Sanitizing may also happen when shutting down the system. Shielder Persona Select 106 may flush memory, caches, temporary files or swap data to prevent any possibility of data leakage when switching from one persona to the next. Furthermore, Shielder Persona Select 106 may encrypt all data written to the disk using active persona classification level, which may make the classification status of the computing environment clear. Each persona may encapsulate its own operating system, applications, and data. Shielder may ensure resources be sanitized before reallocated between personas. Shielder Persona Select 106 may implement the requirements of the commercial solutions for classified (CSfC) data-at-rest capability package to ensure secure keys and encryption of all Shielder module data, software and all persona storage.

Shielder System Monitor 108a, 108b may monitor the system state at runtime and ensure the system is always within the defined limits of the trusted state. Shielder System Monitor 108a, 108b may continuously validate the state and take checkpoints at fixed intervals. For example, Shielder System Monitor 108a, 108b may retrieve the limits of a predefined trusted operation status by querying the security database 120a and continuously collect data on system status of the running persona. Shielder System Monitor 108a, 108b may check whether the collected data on system status of the running persona is within the limits of the predefined trusted operation status. In addition, Shielder System Monitor 108a, 108b may take checkpoints periodically or on certain events like shutdown and boot. Shielder System Monitor 108a, 108b may store the checkpoints into the security database 120a with a timestamp. If any suspicious system activity took place, for example, if the system status of the running persona is not within the limits of the predefined trusted operation status, Shielder System Monitor 108a, 108b may take certain actions. In some embodiments, Shielder System Monitor 108a, 108b may query the trusted checkpoints of the persona from the security database 120a, and restore the system to a trusted status by rolling back the persona to a previous trusted checkpoint based on the timestamp. Shielder System Monitor 108a, 108b may send an alert to notify the user. Depending on the severity of the event and Shielder module configuration, Shielder module may take actions like quarantining the offending application or in some cases initiate a quick response to stop the system.

Shielder System Monitor 108a, 108b may also calculate secure hashes of the software of the running persona and determine signatures by encrypting the secure hashed with cryptographic keys. Shielder System Monitor 108a, 108b may store the signatures into the security database 120a when the persona shuts down or exits (e.g., when switching persona). Shielder Secure Boot 104 may utilize the signatures stored in the security database 120a to validate the persona when rebooting the device and make sure the device system is secure and not tempered.

Shielder Communication Manager 110a, 110b may use firewall to block any unauthorized access. More importantly, Shielder Communication Manager 110a, 110b may allow the persona operating systems to operate with an unchanging, idealized concept of available networks, so the persona operating systems and their contained applications may not need to react to varying connectivity as the device moves from one connectivity domain to another (e.g., from ship-board to aircraft). Shielder Communication Manager 110a, 110b may also use smart algorithms to optimize message delivery and provide load balancing. Shielder Communication Manager 110a, 110b may require accurate knowledge of the changing availability of media (connected or disconnected) and routing information (reachable destinations and security domain of the connected networks). Shielder Communication Manager 110a, 110b may also maintain performance metrics for each hardware interface, such as bandwidth and latency. Shielder Communication Manager 110a, 110b may use the performance metrics to favor one interface over another for certain classes of traffic. The best hardware interface for a class of data may vary over time.

Shielder Communication Manager 110a, 110b may query the security database 120a to retrieve the security profile of the active persona, determine communication pattern and network connectivity requirements of the active persona, and monitor the incoming and outgoing traffic of the active persona to make sure the traffic match the security profile of the persona. When the classified persona is active, Shielder Communication Manager 110a, 110b may ensure to forward the traffic only to classified networks. Shielder Communication Manager 110a, 110b may provide additional security by dropping disallowed traffic and logging security events. Shielder Communication Manager 110a, 110b may work with Shielder System Monitor 108a, 108b to check if there is an associate between any communication pattern and anomalies detected by the monitor. If there is such associating and the event triggered an action on the monitor side or communication side, Shielder Communication Manager 110a, 110b may create an alert to notify the user and add new firewall rules into the security profile by updating the security database 120a to block such traffic.

Shielder modular software solution may protect a computing environment and to enable a multi-level security system. Shielder module may provide protection by a secure boot environment and an integrity check while also supporting anomaly detection and rapid restoration. Multi-level security environment may allow a device to run classified and unclassified software in multiple connectivity environments; maximize application and communication performance while enforcing security domain isolation.

Figure 2:
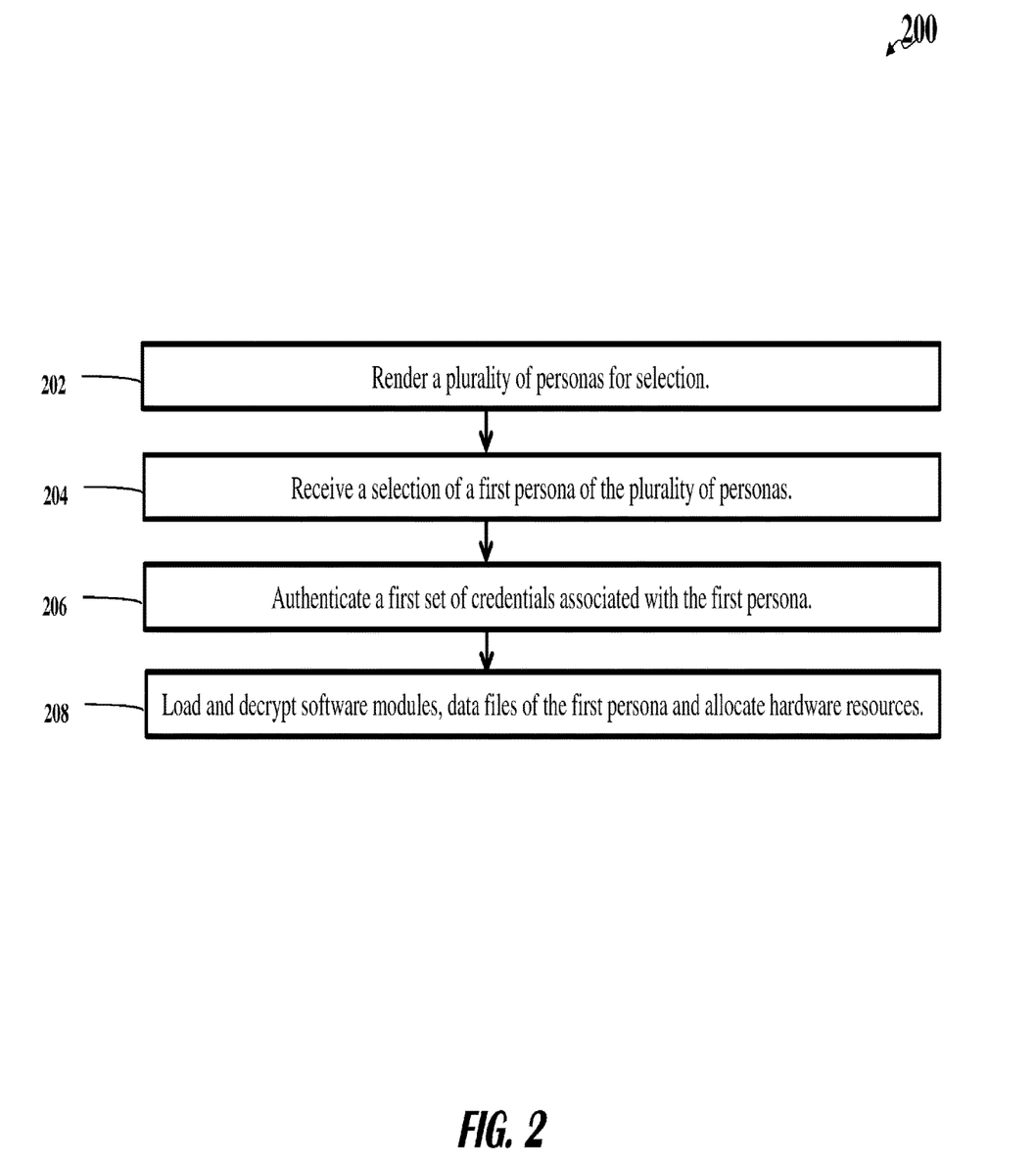
FIG. 2 illustrates a flowchart depicting operational steps for booting a first persona, according to an exemplary embodiment.

FIG. 2 illustrates a flowchart 200 depicting operational steps for booting a first persona, according to an exemplary embodiment. Other embodiments may comprise additional or alternative steps, or may omit some steps altogether.

At step 202, the computing device may render a plurality of personas for selection. The computing device may retrieve a plurality of available personas from a memory and generate a graphical user interface (GUI) including the plurality of personas and graphical interactive components that allow the user to select a persona to run by interacting with the graphical interaction components.

At step 204, the computing device may receive a selection of a first persona of the plurality of personas. For example, the user may be able to select a first persona by clicking a corresponding button included in the GUI. Shielder Persona Selection may provide a means for the user to select a persona to run, and transition from one persona to another, either graphically or via some physical button combination.

At step 206, the computing device may authenticate a first set of credentials associated with the first persona. In operation, the computing device may generate a graphical user interface and require the user to input credentials. Based on the inputted credentials, the computing device may authenticate the user and/or determine the user's role. For example, the computing device may query the user database to retrieve the user credentials, and compare the stored credentials with the inputted credentials. Shielder module may determine the user is an authenticated user when the inputted credentials match the stored credentials from the user database. Only when the user is an authenticated user of the selected persona, the computing device may run the selected first persona. If the user is a new user who has not registered, the computing device may request the user to register. The registration request may include the user's identification information, credentials, and other information. The computing device may generate an account for the user, and save the user's identification information and other required information to the user database. The computing device may comprise any number of input devices configured to receive any number of data inputs, including various types of data inputs allowing for authentication (e.g., username, password, certificates, and biometrics).

One computing device may have multiple personas. For each persona, the computing device may request a user to register, and authenticate the user before running a specific persona. As a result, only authenticated user for a specific persona may be able to access the persona. In addition, a user may register for one or more personas, and be able to access the one or more personas by providing the corresponding authentication information. As a result, for the first Persona Selected by the user, the computing device may authenticate the user based on a first set of user credentials corresponding to the selected persona.

At step 208, the computing device may load and decrypt a first set of software modules and data files and allocate a first set of software modules and data files associated with the first persona and allocating a first set of hardware resources to the first set of software modules and data files. After the computing device authenticate the user credentials corresponding to the first persona, the computing device may retrieve a first set of encrypted software modules, data files and any other applications or software components associated with the first persona from the storage device. As discussed above, the computing device may include multiple personas with each persona encrypted with a different set of keys. After authenticating a user to boot the first persona, the computing device may decrypt the first set of encrypted software modules, data files and any other applications or software components with the cryptographic keys associated with the first persona. The computing device may allocate the hardware resources to the first set of software modules and data fi les, and run the first persona. After the computing device booting the selected first persona, the authenticated user may perform all the operations within the defined limits of the first persona.

In some embodiments, before decrypting and running the persona, Shielder module may validate the selected first by verifying software and hardware components of the selected persona. More specifically, Shielder module may calculate a secure hash for respective software components including the software module and data files, query the cryptographic key from the security database, calculate a signature corresponding to the respective component by encrypting the secure hash with the cryptographic key, and compare the calculated signature with the signature stored in the security database. If each calculated signature matches signature stored in the security database, Shielder module may determine the persona is secure and not tampered.

Figure 3:
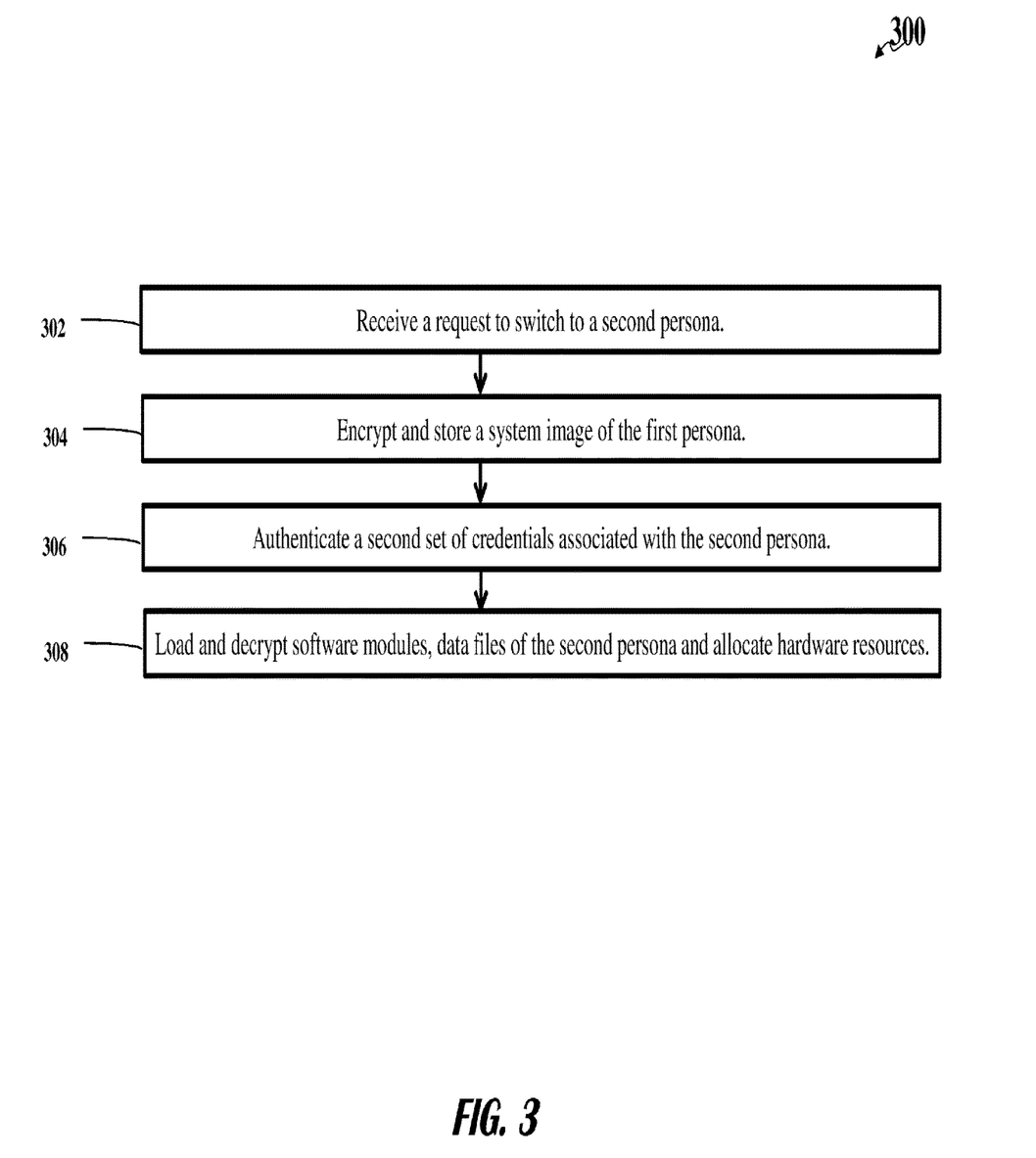
FIG. 3 illustrates a flowchart depicting operational steps for switching from a first persona to a second persona, according to an exemplary embodiment.

FIG. 3 illustrates a flowchart depicting operational steps for switching from a first persona to a second persona, according to an exemplary embodiment. Other embodiments may comprise additional or alternative steps, or may omit some steps altogether.

At step 302, the computing device may receive a request to switch to a second persona. The user may need to switch from one persona to another. For example, an airman may begin the day in an unsecure persona to catch up on personal email and peruse national news on an unsecure shipboard network. When the workday begins, the airman may exit the unsecure persona and enter to secure persona to collaboratively plan a mission. The computing device provide a graphical user interface (GUI) that allows the user to select the second persona and issue a switching request by interacting with one or more interactive components. The computing device may receive the request based on the user's selection and interaction with the GUI.

At step 304, the computing device may encrypt and store a system image of the first persona. When Shielder module switches from a first persona to a second persona, the computing device may encrypt and store a system image of the persona to the security database. Specifically, the computing device may snapshot the system image of the first persona state; encrypt and save the state to the security database; calculate secure hashes and signatures and store the signatures into the security database. Shielder module may intelligently determine an optimal storage allocation and hold some resources back for any persona that requires more storage. By not overcommitting resources, Shielder module may be able to reallocate resources more quickly during the persona switch, as Shielder module may need to sanitize most resources before using the resources in a different security domain. The Persona Select may sanitize physical resources like swap areas (swap area is hard drive space that is reserved to act as extra RAM for when your computer needs more RAM than what is available) to prevent accidental or intentional data leakage between personas. The Persona Select may dynamically allocate persistent storage from a common unallocated store to the two or more personas.

There may be different methods and mechanisms for switching personas. The first approach may be completely by powering down the device and booting the device again in a different security level. The second approach may involve cooperation between Persona Select and Secure Boot to put the active person into a hibernate state and boot the other persona without a complete shutdown and reboot sequence.

At step 306, the computing device may authenticate a second set of credentials associated with the second persona. As discussed above, for each persona, the computing device may request a user to register, and authenticate the user before running a specific persona. In other words, different personas may require different credentials. To run the second persona, the computing device may generate a graphical user interface and require the user to input credentials for the second persona. Based on the inputted credentials, the computing device may authenticate the user and/or determine the user's role. For example, the computing device may query the user database to retrieve the user credentials for the second persona, and compare the stored credentials with the inputted credentials. Shielder module may determine the user is an authenticated user when the inputted credentials match the stored credentials from the user database. Only when the user is an authenticated user of the second persona, the computing device may run the second persona.

At step 308, the computing device may load and decrypt a second set of software modules and data files and allocate a second set of software modules and data files associated with the second persona and allocating a second set of hardware resources to the second set of software modules and data files. After the computing device authenticate the user credentials corresponding to the second persona, the computing device may retrieve a second set of encrypted software modules, data files and any other applications or software components associated with the second persona from the storage device. As discussed above, the computing device may include multiple personas with each persona encrypted with a different set of keys. After authenticating a user to boot the second persona, the computing device may decrypt the second set of encrypted software modules, data files and any other applications or software components with the cryptographic keys associated with the second persona. The computing device may allocate the hardware resources o the second set of software modules and data files, and run the second persona. After the computing device booting the second persona, the authenticated user may perform all the operations within the defined limits of the second persona.

Figure 4:
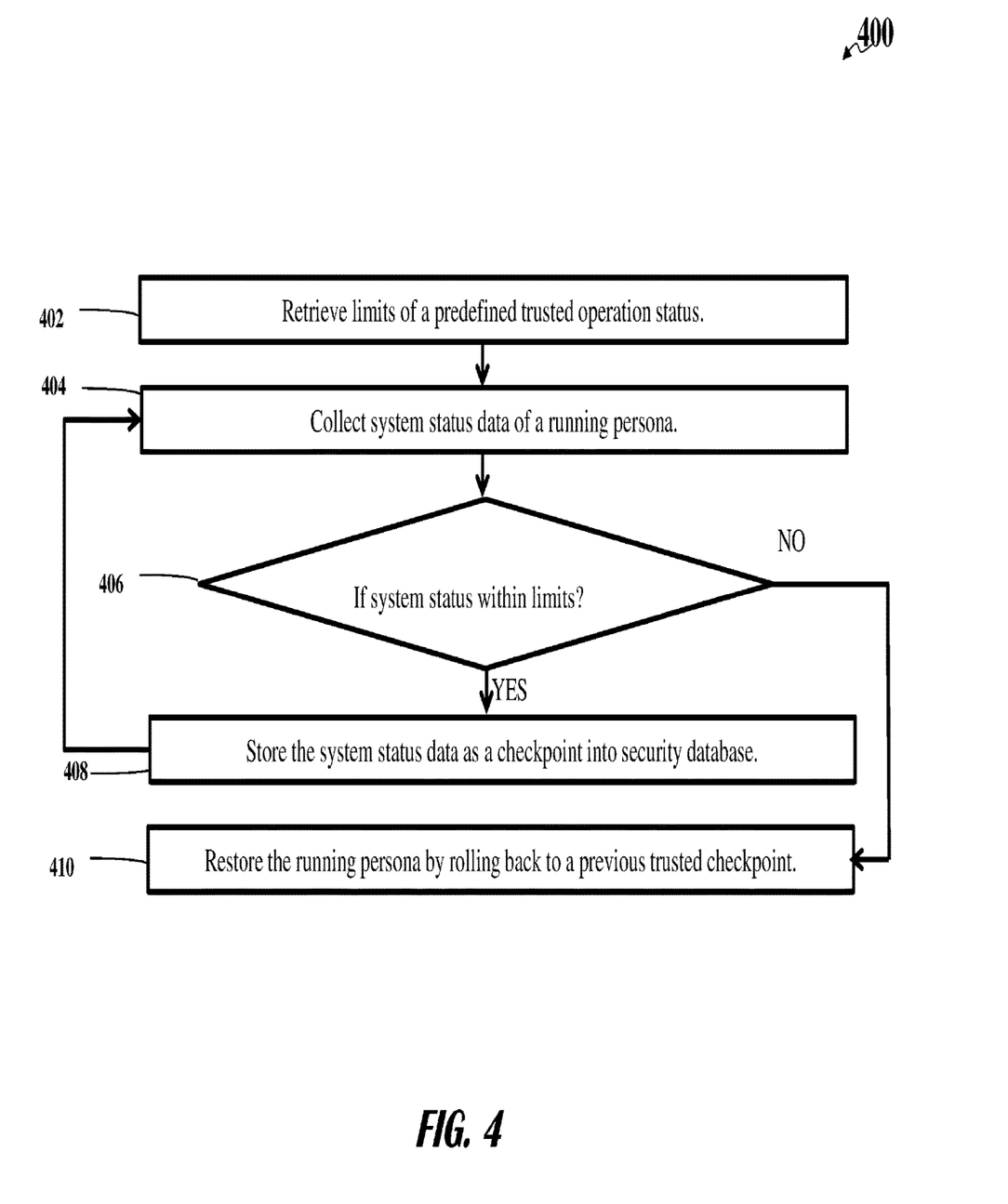
FIG. 4 illustrates a flowchart depicting operational steps for restoring a persona by rolling back to a trusted status, according to an exemplary embodiment.

FIG. 4 illustrates a flowchart depicting operational steps for restoring a persona by rolling back to a trusted status, according to an exemplary embodiment. Other embodiments may comprise additional or alternative steps, or may omit some steps altogether.

At step 402, the computing device may retrieve limits of a predefined trusted operation status of the running persona. The computing device may retrieve the limits of a predefined trusted operation status by querying the security database. The limits of predefined trusted operation status may include the trusted security and maintenance status and criteria of the running persona, including trusted status of the operating system, user account control, and network access.

At step 404, the computing device may continuously collect system status data of a running persona. While the user is performing operations within the persona, Shielder System Monitor may have a complete oversight over the system status and operations. Shielder module may collect data about the system status and continuously monitor the status to ensure the system is working within the limits of a predefined trusted operation status. Shielder module may analyze any issues occurred. Depending on the type of the issue, Shielder System Monitor may respond and take action to mitigate the problem.

At step 406, the computing device may determine whether the system status of the running persona is within the limits of the predefined trusted operation status. For example, the computing device may determine if the user is conducting operations that may cause the system status to violate the security criteria and not within the limits of the trusted status. If the system status is within the limits, the process goes to step 408; otherwise the process goes to step 410.

At step 408, the computing device may store the system status data as a checkpoint into the security database. If the system status is within the limits, the computing device may determine the system status is trusted and store the system status (e.g., system image) as a checkpoint into the security database. The computing device may store the checkpoints with timestamps periodically (e.g., at a fixed interval) or on certain events (e.g., device shutdown and boot). After storing the checkpoint into the security database, the computing device may keep monitoring the system status by going back to step 404 and collecting system status data of the running persona.

At step 410, the computing device may restore the running persona by rolling back to a previous trusted checkpoint. If the system status is not within the limits, the computing device may determine the running persons is unsecure and damaged and restore the system to a trusted status by rolling back the persona to a previous trusted checkpoint based on the timestamp. Furthermore, the computing device may notify the user regarding the suspicious behavior by sending an electronic message to the user. The electronic message may comprise the information on suspicious behavior and problem that causes the system status not within the limits. The electronic message may be in the form of email, text message, instant message, and voicemail.

Shielder module may monitor the system status, user's operations and manage the system communication. Shielder System Monitor may also communicate with other Shielder module components and receive updates related to any issues. For example, Shielder System Monitor may receive a report generated by Secure Boot once the system is up and running. Shielder System Monitor may use the report to notify the user about any potential issues. The report may also serve as the blue print of the computing environment initial state, which may be trusted if it passes the Secure Boot stage.

Shielder System Monitor may also get notification from the Communication Manager about the status of network links and communication subnetworks. The Communication Manager may oversee all communication in and out of the persona. When there is a network issue or an attack, the Communication Manager may notify Shielder System Monitor to take proper action, which may include notifying the user, and in some cases initiating a system roll back to restore the system to a trusted state.

In addition, the computing device may manage the system communication to ensure efficient use of all available communication paths. Shielder Communication Manager may provide load balancing, accommodate changes over time to the number and quality of communication channels, and use dynamic data identification in smart algorithms to optimize message delivery according to application needs (e.g., ensuring first delivery of high-priority packets via the best paths). Shielder Communication Manager may perform tasks without a detailed knowledge of the personas or the corresponding applications. Shielder Communication Manager may balance load traffic between different interfaces in the same security domain, e.g., the Non-classified Internet Protocol (IP) Router Network (NIPRNet). Shielder Communication Manager may use virtual interfaces created by Shielder module to abstract the communication and work without interfering directly with actual application in the environment. Shielder Communication Manager may forward outgoing traffic from the persona-facing interfaces to the hardware-facing interfaces based on link metrics and security policies by acting as a load-balancing router. Shielder Communication Manager may also monitor incoming and outgoing traffic and look for possible suspicious behavior. For example, Shielder Communication Manager may query the security database to retrieve the security profile of the active persona, and check whether the monitored traffic matches the security profile of the persona. Shielder Communication Manager may block the traffic and report to the System Monitor if the traffic has a problem that does not match the security profile.

Shielder Communication Manager may also ensure the communication is only possible when active persona is accessing a network that matches the persona's security domain. For example, most applications in the classified persona would direct traffic to an abstract Secret Internet Protocol Router Network (SIPRNet) interface. Shielder Communication Manager may receive the data and verify that the source persona has a security level appropriate to SIPRNet access, and forward the data to one of the outgoing interfaces connected to the SIPRNet. Shielder Communication Manager may also check if the data matches the security profile of the active persona, and only pass data that matches the security profile. If the destination persona's security level is different from the source, Shielder Communication Manager may block the traffic from the source, log and report the incidence.

When more than one communication link are available, Shielder Communication Manager may gather link metrics to help in dynamic routing decisions. After calculating metrics, Shielder Communication Manager may use the most efficient interface, considering load balancing, and only occasionally redirect a packet to a non-optimal interface to update metrics. Shielder module may employ various techniques to test media not utilized often enough due to limited endpoint connectivity or lack of sufficient traffic. Such techniques may detect and dynamically route around link failures or bottlenecks. One of the techniques may rely on sending Internet control message protocol (ICMP) packets of varying lengths and carefully timing the round trip time of the response to derive bandwidth and latency estimates. Another technique may, leverage routing protocol packets by modifying the packets to estimate the link metrics.

Shielder Communication Manager may perform all dynamic data identification needed to choose the best next hop of multiple media based on packet source, destination, differentiated services code point (DSCP). The identification data may be unencrypted. Shielder Communication Manager may allow administratively approved rules to prioritize competing application traffic. For example, the persona operating system may influence the priority of the Internet protocol (IP) packets by using the DSCP field of IP packets to mark high priority or low latency packets.

While Shielder Communication Manager may have routing behavior from the point of view of a persona, Shielder Communication Manager may be not a router but more akin to the routing functionality built into operating systems to support multiple interfaces. The routing functionality may leverage existing commercial solutions for classified (CSfC) approved solutions in preferences to custom development, to streamline Shielder module certification.

As an example, an airman with a tablet employing Shielder module may begin the day in an unsecure persona to catch up on personal email and peruse national news on an unsecure shipboard network. When the workday begins, the airman may exit the unsecure persona and enter to secure persona to collaboratively plan a mission using joint mission planning system (JMPS), notating goals, waypoints, weather forecasts and blue and red force positions and details. The tablet may use web browser to access secure navy informational web sites to gather additional data to prepare for the mission. Because the mission plan is not finalized, the data may be centrally stored on secure, classified network storage, to be retrieved by the airman when the mission begins. Following the mission planning session, the airman may switch the tablet back into the unsecure persona to perform other assignments that do not require access to the secure networks. When mission begins, the airman may switch the tablet to the secure persona and run specific mission applications, load and organize data from IMPS and other sources specifically relevant to performance of the mission objectives. During the mission, the tablet may operate uninterrupted in multiple network environments, including shipboard secure Wi-Fi environment during the pre-mission briefing, the airplane Wi-Fi environment during flight, and Wi-Fi and tactical cell environments after landing at a forward base. At all times, Shielder module may manage the communication interfaces to ensure security and optimal network provisioning, hiding the complexity of varying network connectivity options from the tablet operating system and applications. When the user switches personas, Shielder module may encrypt the data and reallocate resources as needed to run the second persona.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method, comprising:
   decrypting, by a computer, a first set of machine-readable data of a first persona using a first cryptographic key, at least a portion of the first set of machine-readable data including a first isolated operating system associated with the first persona;
   allocating, by the computer, a first set of resources to the first isolated operating system configured to communicate via a first security domain;
   routing, by the computer, data traffic associated with the first persona according to the first security domain, wherein the computer transmits a data packet of the data traffic when the data packet contains data for a first security profile of the first persona;
   decrypting, by the computer, a second set of machine-readable data of a second persona using a second cryptographic key, at least a portion of the second set of machine-readable data including a second isolated operating system associated with the second persona;
   allocating, by the computer, a second set of resources to the second isolated operating system configured to communicate via a second security domain; and
   routing, by the computer, the data traffic associated with the second persona according to the second security domain.

2. The method according to claim 1, further comprising:
   receiving, by the computer, via an interactive interface a selection of a selected persona from a plurality of personas including at least the first persona and the second persona;
   determining, by the computer, that the selected persona is secure by comparing a generated secure value generated using machine-readable data of an isolated operating system associated with the selected persona against a stored secured value associated with the selected persona; and
   permitting, by the computer, a boot process for the isolated operating system associated with the selected persona in response to determining that the selected persona is secure.

3. The method according to claim 1, further comprising:
   receiving, by the computer, via an interactive interface a selection of a selected persona from a plurality of personas including at least the first persona and the second persona;
   determining, by the computer, that the selected persona is insecure by comparing a generated secure value generated using machine-readable data of an isolated operating system associated with the selected persona against a stored secured value associated with the selected persona; and
   blocking, by the computer, a boot process for the isolated operating system associated with the selected persona in response to determining that the selected persona is insecure.

4. The method according to claim 1, further comprising in response to the computer receiving a request to switch from the first persona to the second persona:
   storing, by the computer, a system image of the first isolated operating system; and
   executing, by the computer, a resource sanitization process for the first set of computing resources prior to allocating the second set of resources.

5. The method according to claim 1, wherein routing the data traffic associated with the first persona further comprises:
   retrieving, by the computer, the first security profile associated with the first persona from one or more security profiles in a security database.

6. The method according to claim 1, wherein routing the data traffic associated with the first persona further comprises:
   identifying, by the computer, at least one of a communication pattern and network connectivity of the first security profile associated with the first persona; and
   comparing, by the computer, the data packet of the data traffic associated with the first isolated operating system against the at least one of the communication pattern and the network connectivity of the first security profile.

7. The method according to claim 6, further comprising:
   responsive to the computer determining that the data packet of the data traffic associated with the first persona matches the at least one of the communication pattern and the network connectivity of the first security profile associated with the first persona, permitting, by the computer, the data packet of the data traffic associated with the first persona.

8. The method according to claim 1, wherein routing the data traffic associated with the first persona further comprises:
dropping, by the computer, a second data packet of the data traffic in response to determining that the second data packet contains data failing to match the first security profile associated with the first persona.

9. The method according to claim 1, wherein the computer dynamically allocates the resources for the first persona or the second persona from a set of common unallocated resources of the computer.

10. A computer based system comprising:
a non-transitory storage medium storing a plurality of machine-readable data files associated with a plurality of personas; and
a processor configured to:
decrypt a first set of machine-readable data of a first persona using a first cryptographic key, at least a portion of the first set of machine-readable data including a first isolated operating system associated with the first persona;
allocate a first set of resources to the first isolated operating system configured to communicate via a first security domain;
route data traffic associated with the first persona according to the first security domain, wherein the processor transmits a data packet of the data traffic when the data packet contains data for a first security profile of the first persona;
decrypt a second set of machine-readable data of a second persona using a second cryptographic key, at least a portion of the second set of machine-readable data including a second isolated operating system associated with the second persona;
allocate a second set of resources to the second isolated operating system configured to communicate via a second security domain; and
route the data traffic associated with the second persona according to the second security domain.

11. The system according to claim 10, wherein the processor is further configured to:
receive, via an interactive interface, a selection of a selected persona from a plurality of personas including at least the first person and the second persona;
determine that the selected persona is secure by comparing a generated secure value generated using machine-readable data of an isolated operating system associated with the selected persona against a stored secured value associated with the selected persona; and
permit a boot process for the isolated operating system associated with the selected persona in response to determining that the selected persona is secure.

12. The system according to claim 10, wherein the processor is further configured to:
receive, via an interactive interface, a selection of a selected persona from a plurality of personas including at least the first person and the second persona;
determine that the selected persona is insecure by comparing a generated secure value generated using machine-readable data of an isolated operating system associated with the selected persona against a stored secured value associated with the selected persona; and
block a boot process for the isolated operating system associated with the selected persona in response to determining that the selected persona is insecure.

13. The system according to claim 10, wherein the processor is further configured to, in response to the processor receiving a request to switch from the first persona to the second persona:
store a system image of the first isolated operating system; and
execute a resource sanitization process for the first set of computing resources prior to the processor allocating the second set of resources.

14. The system according to claim 10, further comprising a database configured to store a plurality of security profiles associated with the plurality of personas,
wherein the processor is further configured to retrieve the first security profile associated with the first persona from one or more security profiles in a security database.

15. The system according to claim 10, wherein the processor is further configured to:
identify at least one of a communication pattern and network connectivity of the first security profile associated with the first persona; and
compare the data packet of the data traffic associated with the first isolated operating sys-tem against the at least one of the communication pattern and the network connectivity of the first security profile.

16. The system according to claim 15, wherein the processor is further configured to:
in response to the processor determining that the data packet of the data traffic associated with the first persona matches the at least one of the communication pattern and the network connectivity of the first security profile associated with the first persona, permit the data packet of the data traffic associated with the first persona.

17. The system according to claim 10, wherein the processor is further configured to drop a second data packet of the data traffic in response to determining that the second data packet contains data for a second security profile.

18. The system according to claim 10, wherein the processor dynamically allocates the resources for the first persona or the second persona from a set of common unallocated resources of the computer.

* * * * *